(12) United States Patent
Tremaine

(10) Patent No.: US 8,219,746 B2
(45) Date of Patent: Jul. 10, 2012

(54) MEMORY PACKAGE UTILIZING AT LEAST TWO TYPES OF MEMORIES

(75) Inventor: Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/576,028

(22) Filed: Oct. 8, 2009

(65) Prior Publication Data

US 2011/0087834 A1   Apr. 14, 2011

(51) Int. Cl.
*G06F 12/00* (2006.01)

(52) U.S. Cl. ......... 711/105; 709/999.012; 709/E12.005; 711/103; 711/162; 711/E12.007; 711/E12.103

(58) Field of Classification Search ........... 709/999.001, 709/E12.005; 711/103, 105, 162, E12.103, 711/E12.007

See application file for complete search history.

(56) References Cited

U.S. PATENT DOCUMENTS

| | | | |
|---|---|---|---|
| 5,758,182 A | 5/1998 | Rosenthal et al. | |
| 6,216,180 B1 * | 4/2001 | Kendall et al. | 710/35 |
| 7,526,610 B1 | 4/2009 | Emma et al. | |
| 2003/0078907 A1 * | 4/2003 | Soemo et al. | 707/1 |
| 2006/0106984 A1 | 5/2006 | Bartley et al. | |
| 2008/0016297 A1 | 1/2008 | Bartley et al. | |

* cited by examiner

*Primary Examiner* — Kevin Ellis
*Assistant Examiner* — Mehdi Namazi
(74) *Attorney, Agent, or Firm* — Matthew C. Zehrer

(57) ABSTRACT

A memory system and methods for memory manage are presented. The memory system includes a volatile memory electrically connected to a high-density memory; a memory controller that expects data to be written or read to or from the memory system at a bandwidth and a latency associated with the volatile memory; a directory within the volatile memory that associates a volatile memory address with data stored in the high-density memory; and redundant storage in the high-density memory that stores a copy of the association between the volatile memory address and the data stored in the high-density memory. The methods for memory management allow writing to and reading from the memory system using a first memory read/write interface (e.g. DRAM interface, etc.), though data is stored in a device of a different memory type (e.g. FLASH, etc.).

19 Claims, 11 Drawing Sheets

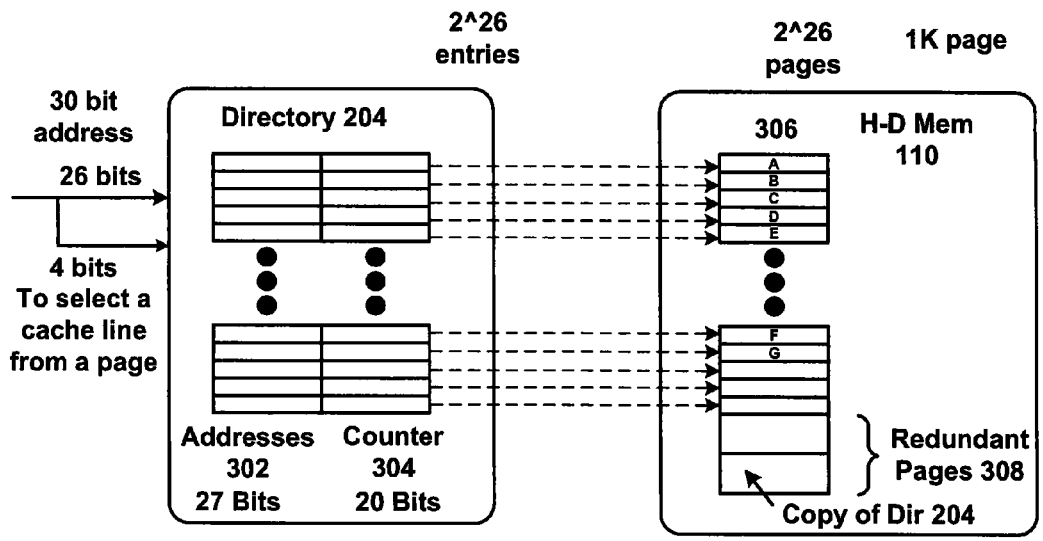
FIG. 4
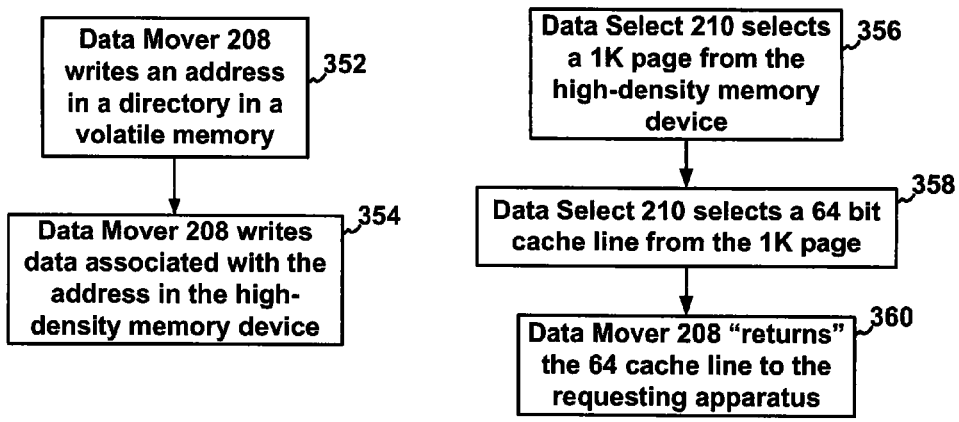
FIG. 5A  FIG. 5B

MEMORY PACKAGE UTILIZING AT LEAST TWO TYPES OF MEMORIES

FIELD OF THE INVENTION

Embodiments of the present invention relate to the storage of electronic data. More particularly embodiments of the present invention relate to a memory package utilizing at least two types of memories.

DESCRIPTION OF THE RELATED ART

A computer system may include low latency volatile memory, such as DRAM. The computer system performance may be directly proportional to the amount of memory included in the computer system. However the amount of memory included in the computer system may be limited due to heat generation, cost, physical packaging constraints, etc. associated with such memory.

Recently some computer systems have started to utilize a higher density higher latency memory, such as FLASH memory, in addition to or in lieu of the low latency volatile memory.

However, the utilization of both the high latency and low latency memory types creates additional challenges for effective memory management.

SUMMARY OF THE INVENTION

In an embodiment of the present invention, a memory system includes a volatile memory electrically connected to a high-density memory; a memory controller that expects data to be written or read to or from the memory system at a bandwidth and a latency associated with the volatile memory; a directory within the volatile memory that associates a volatile memory address with data stored in the high-density memory; and redundant storage in the high-density memory that stores a copy of the association between the volatile memory address and the data stored in the high-density memory.

In other embodiments of the present invention methods for utilization and management of both the high latency and low latency memory types are described. The methods for efficient memory usage allow writing to and reading from the memory system using a first memory read/write interface (e.g., DRAM interface, etc.), though data is stored in a device of a different memory type (e.g. FLASH, etc.).

BRIEF DESCRIPTION OF THE FIGURES

FIG. 4 depicts an exemplary directory scheme to map a volatile memory address to a high-density memory address in accordance with various embodiments of the present invention.

FIG. 5A depicts an exemplary write scheme according to various embodiments of the present invention.

FIG. 5B depicts an exemplary read scheme according to various embodiments of the invention.

DETAILED DESCRIPTION OF THE EMBODIMENTS

Figure 1:
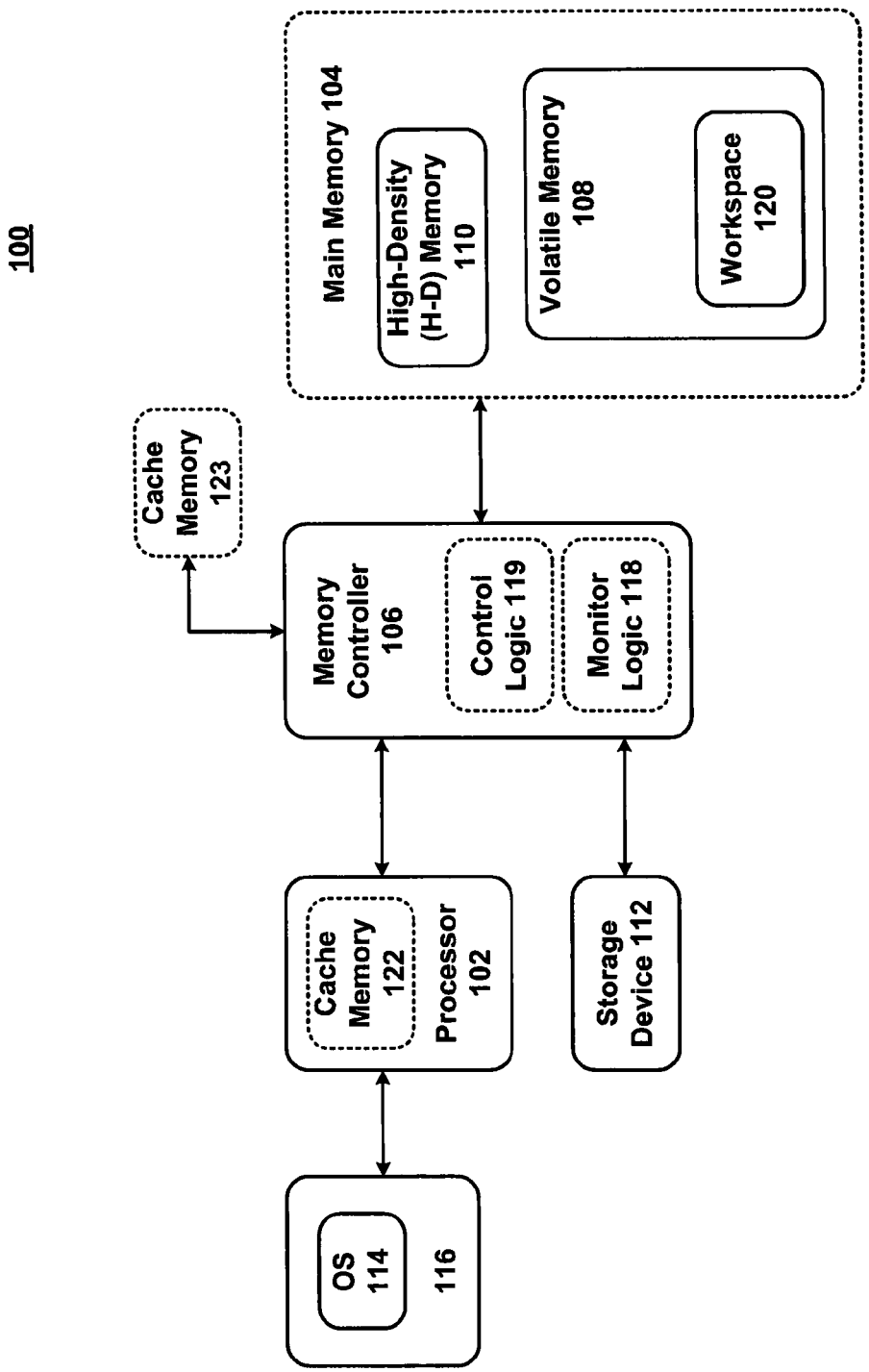
FIG. 1 depicts a computing apparatus for efficient memory utilization in accordance with various embodiments of the present invention.

For a better understanding of the various embodiments of the present invention, together with other and further features and advantages thereof, reference is made to the following description, taken in conjunction with the accompanying drawings, and the scope of the invention asserted in the claims.

It will be readily understood that the components of the present invention, as generally described and illustrated in the Figs. herein, may be arranged and designed in a wide variety of different configurations. Thus, the following more detailed description of the embodiments of the apparatus, system, and method of the present invention, as represented in FIGS. 1 through 15, are not intended to limit the scope of the invention, as claimed, but are merely representative of selected exemplary embodiments of the invention.

As will be appreciated by one skilled in the art, various embodiments of the present invention may be embodied as a system, method, computer program product or any combination thereof. Accordingly, embodiments of the present invention may take the form of an entirely hardware embodiment, an entirely software embodiment (including firmware, resident software, micro-code, etc.) or an embodiment combining software and hardware aspects that may all generally be referred to, for example as a "circuit," "module" or "system." Furthermore, embodiments of the present invention may take the form of a computer program product embodied in any tangible medium having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic or other such storage device.

Computer program code for carrying out operations of embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, or as a stand-alone software package.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. In addition, features described in connection with a particular embodiment may be combined or excluded from other embodiments described herein.

Embodiments of the present invention are described below with reference to flowchart illustrations and/or block diagrams of methods, apparatus, systems, and computer program products according to embodiments of the invention. It will be understood that each block of the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In some alternative embodiments, the functions noted in the blocks may occur out of the order noted in the Figs. For example, two blocks shown in succession may, in fact, be executed substantially concurrently, or the blocks may sometimes be executed in the reverse order, depending upon the functionality involved. In various embodiments, each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 1 is a block diagram of a computing apparatus for efficient memory usage in accordance with various embodiments of the present invention. In various embodiments the apparatus may be a computer system, mobile device, server, or similar device. With reference to FIG. 1, the apparatus 100 may include a processor 102 for executing instructions. The processor 102 is coupled to main memory 104 (e.g., via a memory controller 106 which may include control logic 119, monitor logic 118, etc.). The main memory 104 includes one or more volatile memories 108, such as DRAMs or the like, and one or more high-density memories 110, such as flash memories or the like.

Read and write operations to the volatile memory 108 and a read operation to the high-density memory 110 may be completed quickly. However, a write operation to the high-density memory 110 relatively may take substantially more time than the above-mentioned operations. For example, read and write operations to the volatile memory 108 may be completed in nanoseconds. Similar to a read operation on the volatile memory 108, a read operation on the high-density (e.g., flash) memory 110 may be completed in nanoseconds. However, in contrast to the volatile memory 108, a write operation to the high-density memory 110 may require milliseconds to complete, and therefore, may result in long write latency.

In some embodiments, the memory controller 106 may be also coupled to a first storage device 112, such a disk drive, memory or the like. In response to a request from the processor 102, the memory controller 106 may retrieve data stored in the first storage device 112 and write (e.g., store) such data in the main memory 104. For example, a page (e.g., 4 kB or more) of data may be retrieved from the storage device 112 and stored in the main memory 104. Alternatively, the apparatus 100 may include on cache memory 123 (e.g. Level 2 cache, Level 3 cache, etc.) (shown in phantom) that serves as the temporary storage device. In such embodiments, the cache memory 123 may be coupled to and/or included in the processor 102.

The apparatus 100 may include a monitoring device for identifying memory locations that are characterized as infrequently or never written to. In some embodiments, the processor 102 may serve as the monitoring device by executing software 114. Such software 114 may be included in an operating system (OS) executed by the processor 102. In some embodiments, the OS may be stored in a read-only memory (ROM) 116. However, the software 114 may be separate from the OS.

Alternatively, the apparatus 100 may include monitoring logic 118 and control logic 119 (shown in phantom) that serves as the monitoring device and/or controlling device. The memory controller 106, monitoring logic 118, and/or control logic 119 may include any suitable combination of logic, registers, memory or the like. In some embodiments, the memory controller 106 includes the monitoring logic 118 and/or control logic 119 (although, the monitoring logic 118 and/or control logic 119 may be located elsewhere.)

As described above, the apparatus 100 includes high-density memory 110, which is denser, less expensive and consumes less power than volatile memory 108 for performing a read operation. Therefore, the present invention may allow more memory to be coupled to the processor 102 than a conventional computer system with a main memory which only consists of, for example, DRAM.

Figure 2:
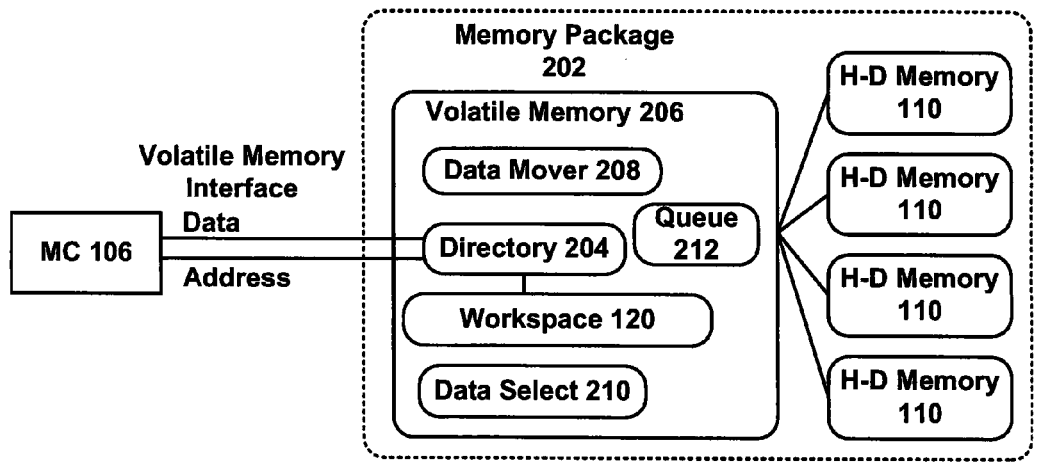
FIG. 2 depicts a memory package utilizing two memory types in accordance with various embodiments of the present invention.

FIG. 2 depicts a memory package utilizing two memory types 202, herein referred to as memory package 202, in accordance with various embodiments of the present invention. Memory package 202 includes a plurality of high-density memories 110 and a volatile memory 206. Within the volatile memory 206 there comprises a directory 204, a data mover 208, and a data selector 210. In certain embodiments volatile memory 206 also includes workspace 120 and/or a queue 212. During a write operation, data and associated address information is written to memory package 202 utilizing a volatile memory interface (e.g. the memory controller expects data to be written or read to or from the memory system at a bandwidth and latency associated with the volatile memory, etc.). During a read operation, data is read from memory package 202 utilizing the similar volatile memory interface.

Directory 204 maps, or otherwise associates, a first volatile address to a first high-density memory address allowing a computing system, mobile device, server, etc., to write to or read from a high-density memory 110 utilizing a different memory read/write interface (e.g. a volatile memory interface).

During a write operation, data mover 208 moves data associated with the first volatile memory address to the first high-density memory address. During a read operation, data mover 208 reads, or otherwise obtains, data from a first high-density memory address. Also during a read operation, data selector 210 selects the appropriate data in the high-density memory to be moved to the volatile memory 206 (e.g. a 1K page, a 64 bit cache line, etc.).

Because of the read/write latency differences between volatile memory and high-density memory, in various embodiments the directory 204 allows for a designated section of the volatile memory 206 to serve as a cache for the high density memory 110. In various embodiments queue 212 may be utilized as the cache within the volatile memory 206. Queue 212 may perform a read and/or write operation with short latency. Because of the latency differences, address information may be continuously added to directory 204 even though the data associated with those address have not been stored in high-density memory 110. Therefore the associated data may be stored in queue 212 temporarily. The data stored in queue 212 may be written to high-density memory 110 in a FIFO order.

In some embodiments directory 204 is sufficiently large so as to take up all or most of all the storage capacity of volatile memory 206. However, in other embodiments any extra storage capacity may be utilized by the computing system, mobile device, server, etc, as usable storage capacity. The extra storage capacity may be a portion 120 of the volatile memory 206 is allocated as a working space (e.g. DRAM storage space, etc.)

Figure 3:
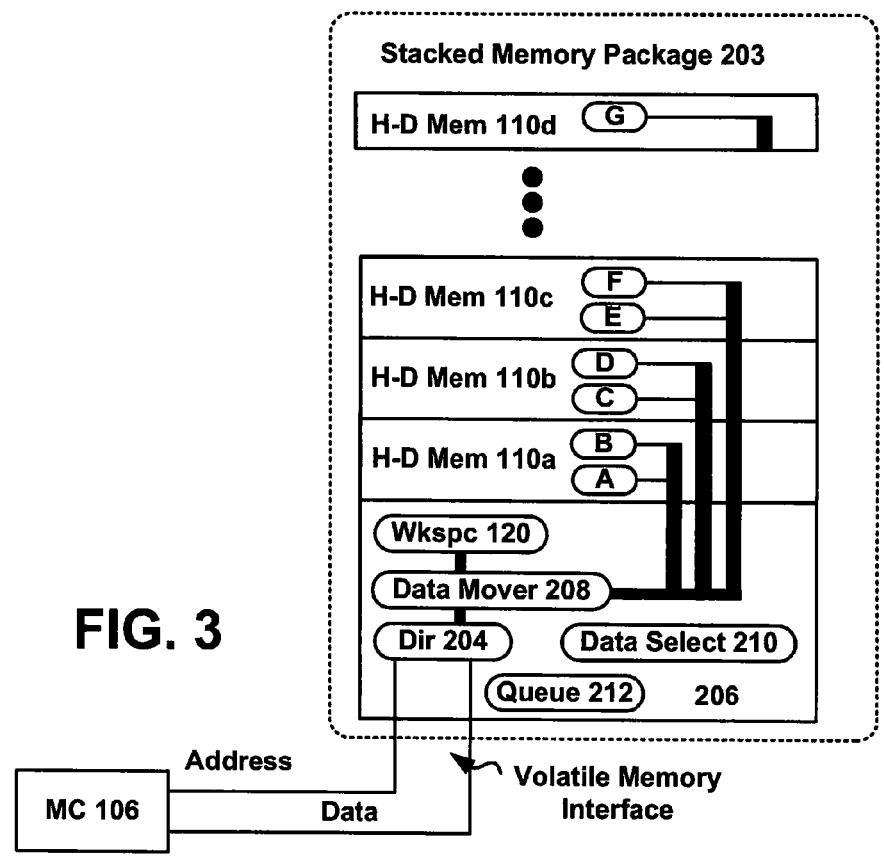
FIG. 3 depicts a stacked memory package utilizing two memory types in accordance with various embodiments of the present invention.

FIG. 3 depicts a stacked memory package utilizing two memory types 203, herein referred to as stacked memory package 203, in accordance with various embodiments of the present invention. Stacked memory package 203 includes a plurality of high-density memories 110 upon volatile memory 206 in a vertical stack. In the present embodiment the high-density memories 110 and the volatile memory 206 are embodied as a memory chip. Therefore, when appropriate, high-density memory 110 and volatile memory 206 may be referred to as high-density chip and volatile memory chip respectively.

Each high-density chip 110 is electrically connected to volatile memory chip 206. A high-density chip 110 may be electrically connected to the volatile memory layer 206 with through silicon via, or other equivalent connection apparatus or connection system. Within the volatile memory layer 206 there comprises the directory 204, the data mover 208, and the data selector 210. In certain embodiments volatile memory layer 206 also includes workspace 120, and queue 212. During a write operation, data and associated address information is written to memory package 203 utilizing a volatile memory interface. During a read operation, data and associated address is read from stacked memory package 203 utilizing the similar volatile memory interface.

In each high-density memory 110 there exists at least one storage location or address. In other embodiments however there exists a plurality of storage location in each high-density memory 110. For example, storage locations (A) and (B) are shown in high-density memory 110a, storage locations (C) and (D) are shown in high-density memory 110b, storage locations (E) and (F) are shown in high-density memory 110c, and storage location (G) is shown in high-density memory 110d.

FIG. 4 depicts an exemplary directory 204 to map a volatile memory address to a high-density memory address in accordance with various embodiments of the invention. Directory 204 includes an address table 302 and a counter table 304. During a write operation the processor 102 or the memory controller 106 sends address information and data associated with the address to the volatile memory 206. The address table 302 stores the address received, and the data associated with the address is written to the high-density memory 110. The counter table 304 stores either a write count, a read count, or both a write count and read count that is associated with the address stored in the address in high-density memory 110 where the data was written/read.

Though a specific example of a directory scheme is described herein, a different directory or mapping scheme may be utilized without deviating from the scope of the various embodiments of the present invention. In a particular directory scheme, the directory 204 receives thirty bits of data addressing a particular cache line of 64 bits. Twenty six bits are used to address a one kilobyte page (sixteen cache lines in a block). Four bits are utilized by data selector 210 to find an appropriate 64 bit cache line within the one kilobyte page. Address table 302 contains 2 26 entries where each entry stores twenty seven bits of data. In addition to the twenty six bits used to address a one kilobyte page, an extra bit is used to identify whether the one kilobyte page has moved locations in the high-density memory 110. In certain embodiments, the counter table 304 also contains 2 26 entries where each entry stores twenty bits of data allowing a read/write count up to a million instances.

Also depicted in FIG. 4 is a high-density workspace 306 within the high-density memory 110. Each entry in high-density workspace 306 stores the data associated with the address stored in the address table 304. For example, storage locations (A), (B), (C), (D), (E), (F), and (G) in the various locations of volatile memory 204 correspond to entries (A), (B), (C), (D), (E), (F), and (G) respectively in high density memory 110.

In certain embodiments, high-density workspace 306 also includes extra or redundant storage 308. Redundant storage 308 may be utilized to provide the capacity needed to move data that was stored in a first entry. Data may need to be written to redundant storage 308, if a particular location or entry in high-density memory 110 is written to too many instances (e.g., the particular location has worn or is likely to become worn because it is been written to a large number of instances, etc.). Further, if data has been read from a particular location in high-density memory 110, too many instances that data may be moved to redundant storage 308 prior to the location becomes worn or otherwise fails. In addition a copy of the directory 204 may be kept in redundant storage 308. When the contents of directory 204 are changed, the new address information is written to the appropriate location in the copy of the directory 204 that is stored in redundant storage 308.

FIG. 5A depicts an exemplary data selection and data moving scheme according to various embodiments of the present invention. During a write operation, data mover 208 writes a first volatile memory address in directory 204 (block 352). Data mover 208 also moves data associated with the first volatile memory address to the first high-density memory (block 354).

FIG. 5B depicts an exemplary data selection and data moving scheme according to various embodiments of the present invention. During a read operation, data selector 210 selects the appropriate data (e.g. 1K page, etc.) in the high-density memory to be moved (block 356). In some embodiments, data selector 210 may also select a cache line from the appropriate page (block 358). Data mover 208 reads, or otherwise obtains, data from a first high-density memory address (block 360). Data mover 208 may also return the appropriate data (e.g. 1K page, 64 bit cache line, etc.) to the volatile memory chip 206, processor 102, etc.

In various embodiments data mover 208 and data selector 210 may include any suitable combination of logic, latches, registers, memory or the like. In some embodiments, the data selector 210 is combined with data mover 208. In other embodiments, the data selection function and the data moving function are at least partly embodied within memory controller 106.

Figure 6:
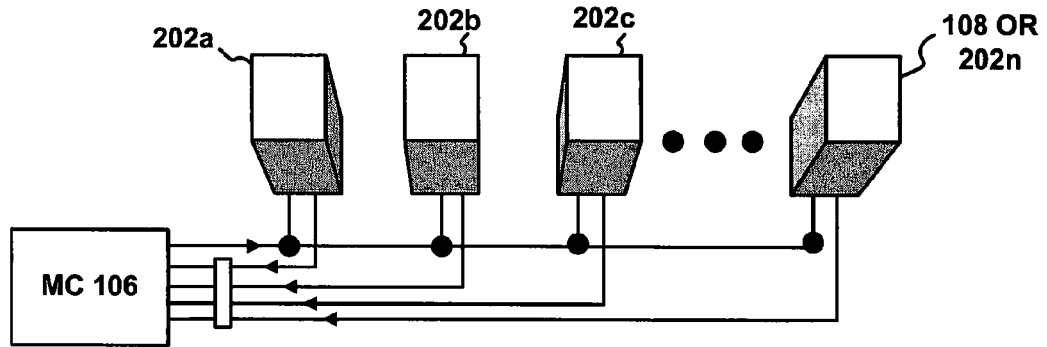
FIG. 6 depicts multiple memory packages utilizing two memory types connected to a memory controller according to various embodiments of the present invention.
Figure 7:
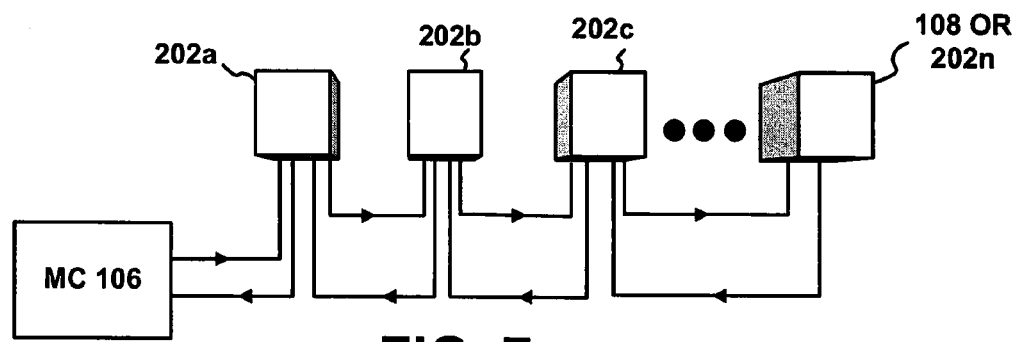
FIG. 7 also depicts multiple memory packages utilizing two memory types connected to a memory controller according to various embodiments of the present invention.

FIG. 6 and FIG. 7 are referred to simultaneously. FIGS. 6 and 7 depict a plurality of memory packages utilizing two memory types (e.g. 202*a*-202*c*, 203*a*-203*c*, etc.) connected to memory controller 106 in a mufti-drop net and daisy chain configuration respectively according to various embodiments of the present invention. In some embodiments one or more volatile memories 108 may also be included in the memory subsystem along with a single or multiple high-density memory package(s) 202/203.

Figure 8:
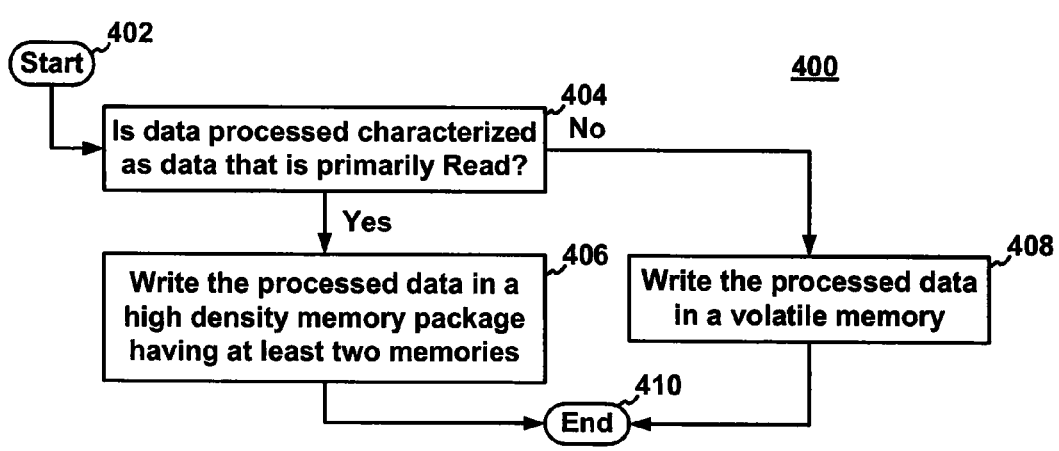
FIGS. 8-14 depict methods of efficient memory usage according to various embodiments of the present invention.

FIG. 8 depicts a method 400 for efficient memory usage according to various embodiments of the present invention. Method 400 is utilized by monitor logic 118 to determine what type of memory to write to (e.g., memory package with two memory types, conventional volatile memory, workspace 120 within the memory package with two memory types, etc.). Method 400 starts at block 402. It is determined if data being processed is characterized as data that is primarily to be read (block 404). If the data being processes is characterized as data that is primarily to be read, the data is written to the high-density memory 110 in a memory package utilizing two memory types (e.g., memory package 202, stacked memory package 203, etc.) (block 406). If the data being processed is not characterized as data that is primarily to be read, the data is written in a volatile memory 108, or in an alternative embodiment, the workspace 120 in the volatile memory 206 (block 408). Method 400 ends at block 410.

Figure 9:
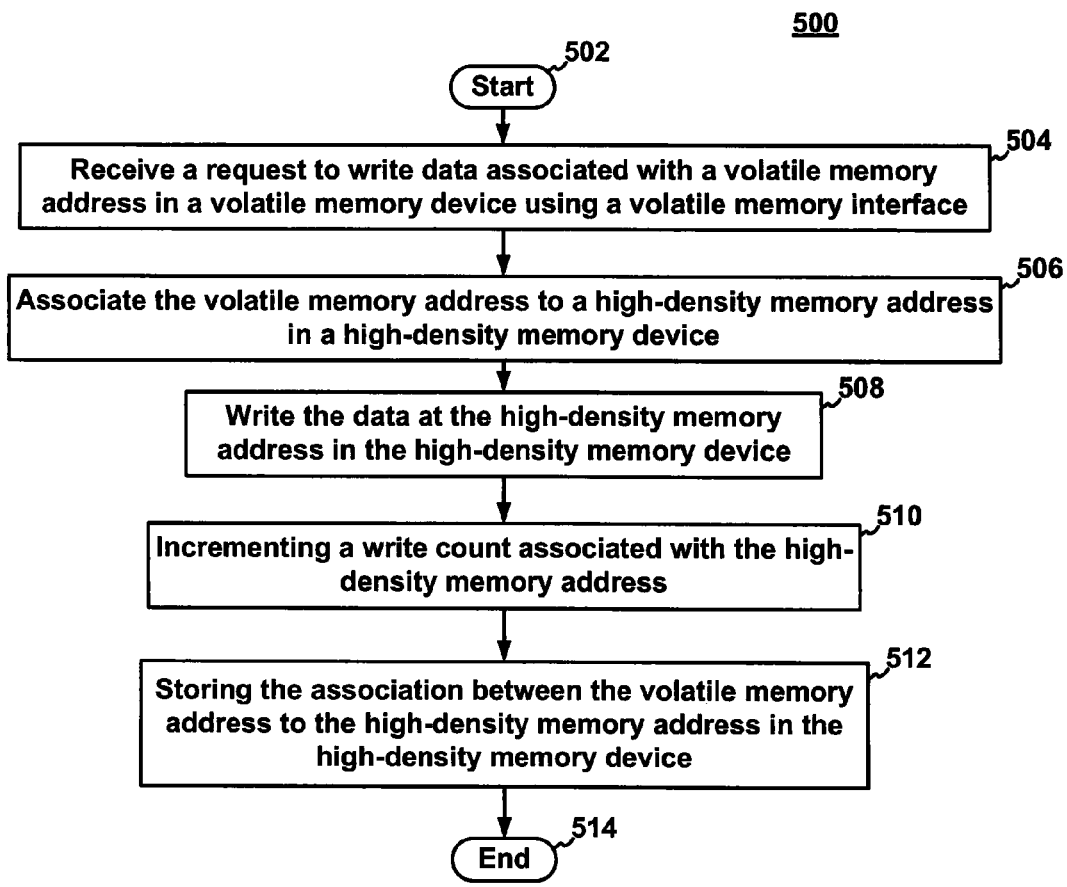

FIG. 9 depicts a method 500 for efficient memory usage according to various embodiments of the present invention. Method 500 is utilized by control logic 119 to write data in a memory package having two memory types using a volatile memory write command interface. Method 500 begins at block 502. A memory package with two memory types or a memory controller receives a request to write data associated with a volatile memory address in a volatile memory device using a volatile memory interface (block 504). The volatile memory address is mapped, or otherwise associated, to a high-density memory address in a high-density memory device (block 506). The data is written to the high-density memory address in the high-density memory device (block 508). A write counter associated with the high-density memory address is incremented (block 510). The association between the volatile memory address and the high-density memory address is stored in the high-density memory device (block 512).

Figure 10:
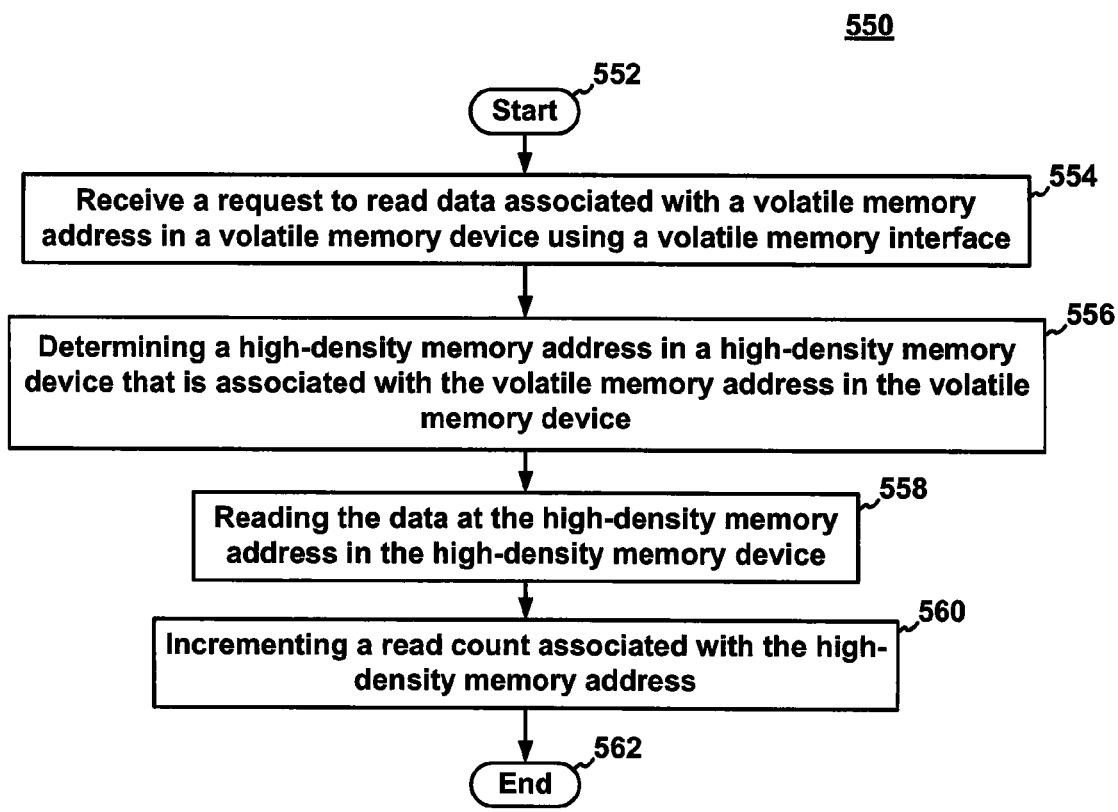

FIG. 10 depicts a method 550 of efficient memory usage according to various embodiments of the present invention. Method 550 is utilized by control logic 119 to read data in a memory package with two memory types using a volatile memory read interface. Method 550 begins at block 552. A memory package having two memory types or a memory controller receives a request to read data associated with a volatile memory address in a volatile memory device using a volatile memory interface (block 554). The association between a high-density memory address in a high-density memory device and the volatile memory address is determined (block 556). The data at the high-density memory address in the high-density memory device is read (block 558). A read counter associated with the high-density memory address in the high-density memory device is incremented (block 560). Method 550 ends at block 562.

Figure 11:
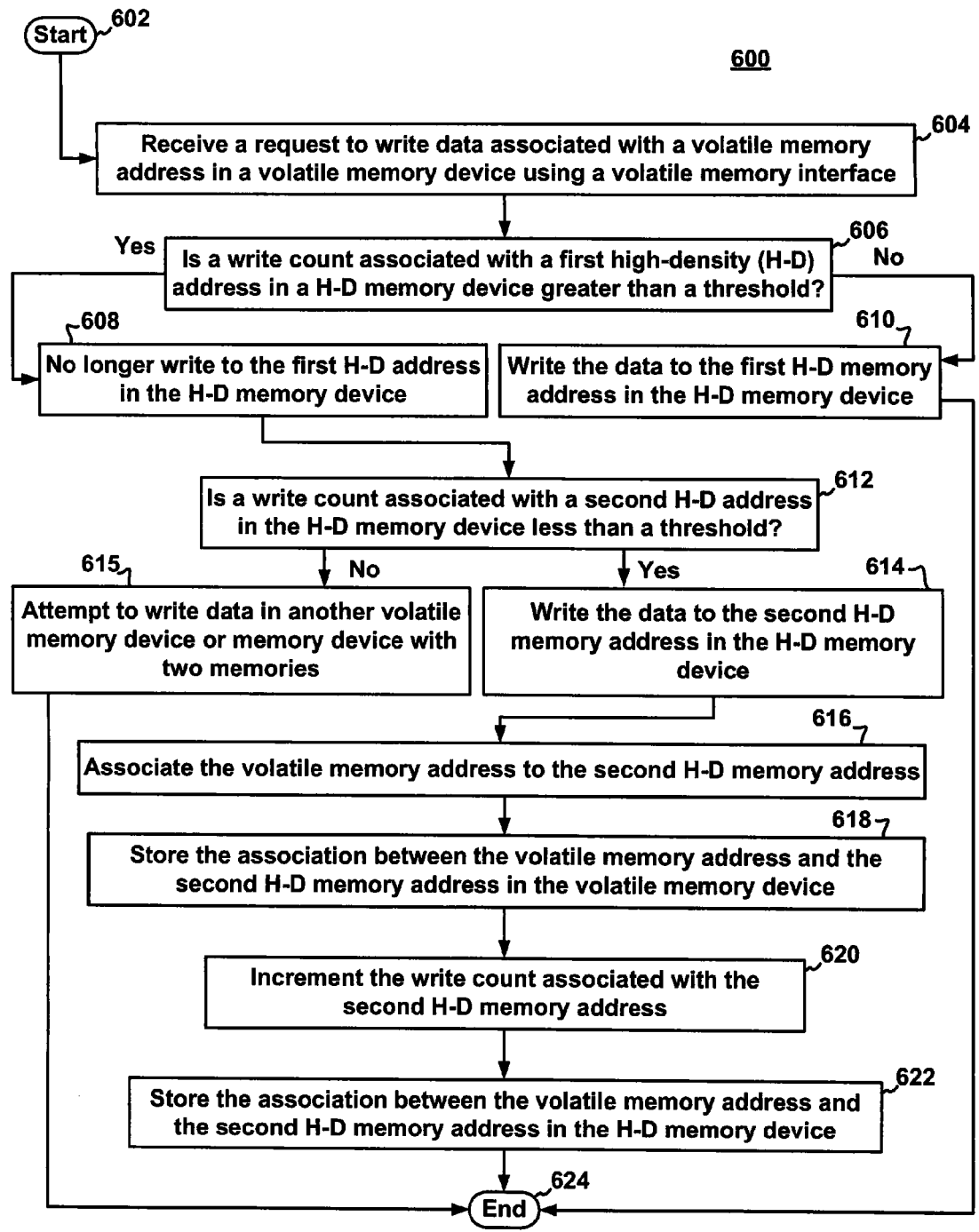

FIG. 11 depicts a method 600 for efficient memory usage according to various embodiments of the present invention. Method 600 may be utilized by control logic 119 to write data in a memory package having two memory types utilizing a volatile memory write interface. Method 600 begins at block 602. A memory package with two memory types or a memory controller receives a request to write data associated with a volatile memory address in a volatile memory device having a volatile memory interface (block 604). It is determined whether a write count associated with a high-density memory address in a high-density memory device is greater than a threshold count (block 606). If it is determined that a write count associated with the high-density address in the high-density memory device is above the threshold, data is no longer written to the high-density address in the high-density memory device (block 608). If it is determined that a write count associated with the high-density address in the high-density memory device is less than the threshold, the data is written to the high-density memory address in the high-density memory device (block 610). Subsequent to determining whether the write count associated with the high-density address in the high-density memory device is above the threshold, it is determined whether a write count associated with a second high-density address in the high-density memory device is less than a threshold (block 612). If the write count associated with the second high-density address in the high-density memory device is less than the threshold, the data is written to the second high-density memory address in the high-density memory device (block 614). If the write count associated with the second high-density address in the high-density memory device is greater than the threshold, the data may be written to another volatile memory or another memory package having two memory types (block 615). If the data is written to the second high-density memory address in the high-density memory device, the volatile memory address is mapped, or otherwise associated, to the second high-density memory address (block 616). The associated between the volatile memory address and the second high-density memory address is stored in the volatile memory device (block 618). The write count associated with the second high-density memory address is incremented (block 620). The association between the volatile memory address and the second high-density memory address is stored in the high-density memory device (block 624). Method 600 ends at block 624.

Figure 12:
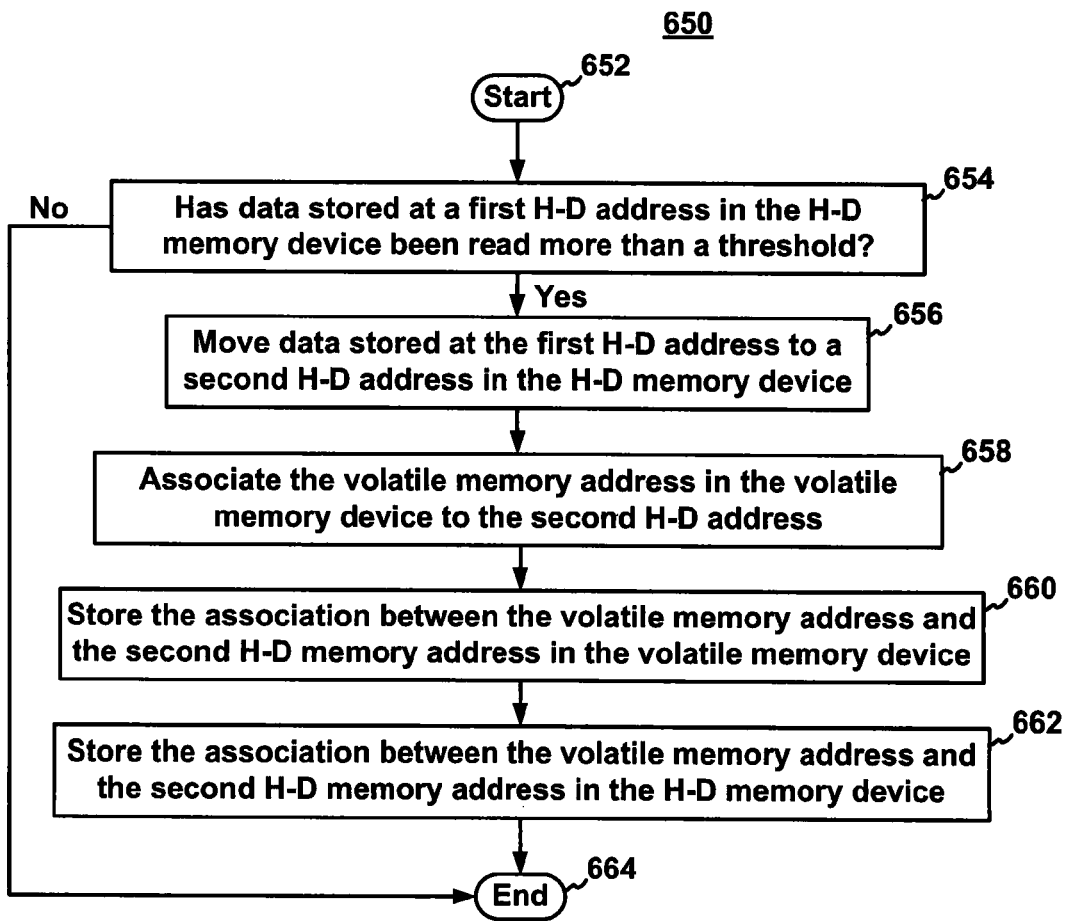

FIG. 12 depicts a method 600 of efficient memory usage according to various embodiments of the present invention. Method 600 may be utilized by control logic 119 to efficiently read data in a memory package having two memory types using a volatile memory read interface. Method 600 begins at block 602. It is determined whether data stored at a first high-density memory address in a high-density memory device has been read more than a threshold number of instances (block 654). If data stored at the first high-density memory address in the high-density memory device has been read more than a threshold number of instances, the data is moved from the first high-density memory address to a second high-density memory address in the high-density memory device (block 656). The volatile memory address is mapped, or otherwise associated, to the second high-density memory address (block 658). The association between the volatile memory address and the second high-density memory address is stored in the volatile memory device (block 660). The association between the volatile memory address and the high-density memory address is stored in the high-density memory device (block 662). If the data at the high-density address is subsequently read, the read count associated with the second high-density memory address is incremented. Method 650 ends at block 664.

Figure 13:
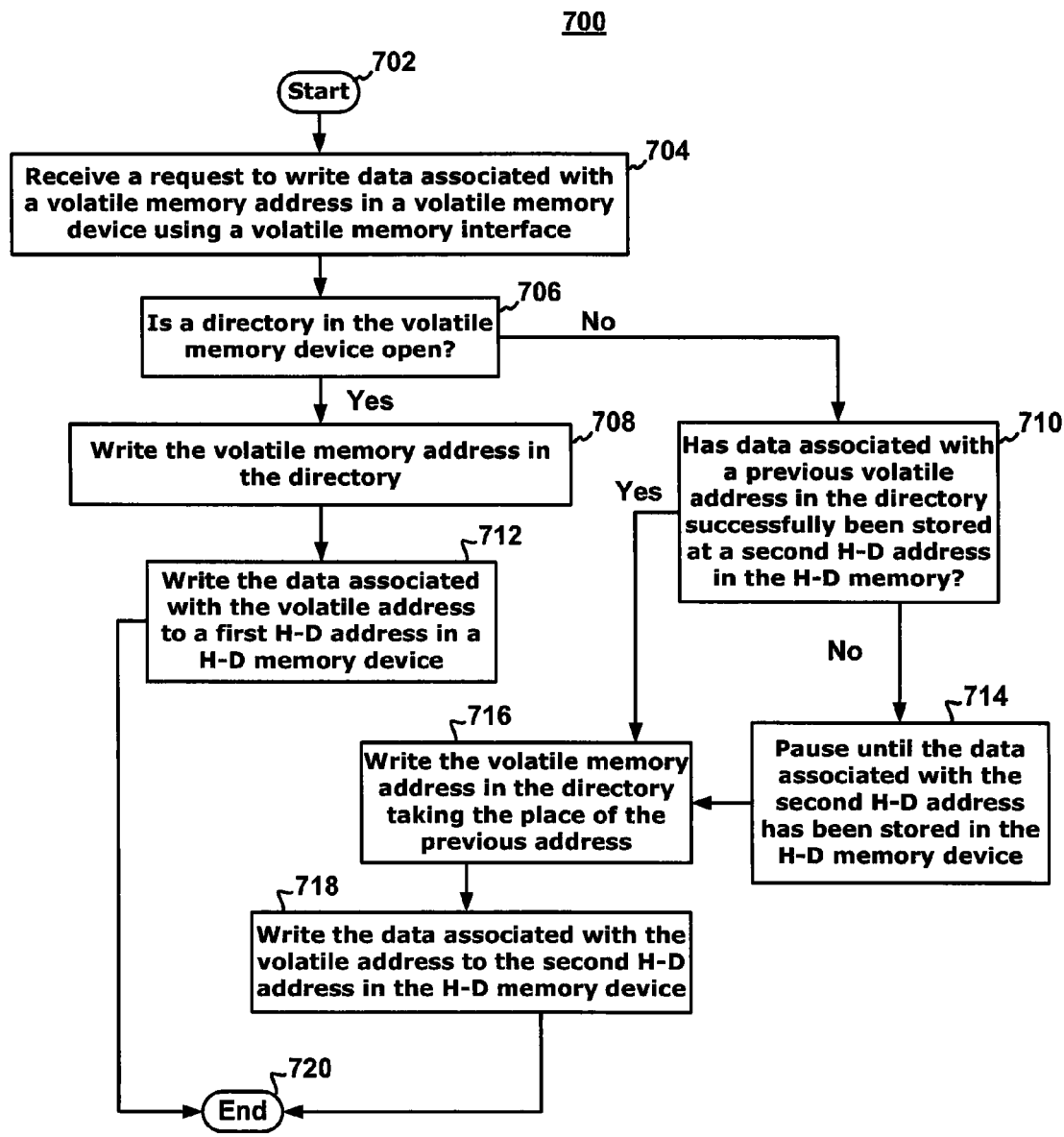

FIG. 13 depicts a method 700 for efficient memory usage according to various embodiments of the present invention. Method 700 may be utilized by control logic 119 to write data in a memory package having two memory types using a volatile memory write interface. Method 700 begins at block 702. A memory package having two memory types or a memory controller receives a request to write data associated with a volatile memory address in a volatile memory device having a volatile memory interface (block 704). It is determined if a directory in the volatile memory device is open, or otherwise available to receive address data (block 706). If the directory in the volatile memory device is open, the volatile memory address is written in the directory (block 708). The data associated with the volatile address is written to a high-density memory address in a high-density memory device (block 712).

If the directory in the volatile memory device is not open, it is determined whether any previous data associated with a previous address in the directory was successfully written at a second high-density memory address in the high-density memory device. If any previous data associated with the previous address in the directory was successfully written at the second high-density memory address in the high-density memory device, the volatile memory address is written in the directory taking the place of the previous address (block 716). The data associated with the volatile memory address is written to the second high-density address in the high-density memory device (block 718).

If no previous data associated with any previous address in the directory was successfully written at the second high-density memory address in the high-density memory device, the volatile memory address is not written to the directory until the data associated with the previous address has been stored at the second high-density memory address in the high-density memory device (block 714). Subsequent to successfully writing the data associated with the previous address at the second high-density memory address in the high-density memory device, method 700 proceeds to block 716 as described above. Method 700 ends at block 720.

Figure 14:
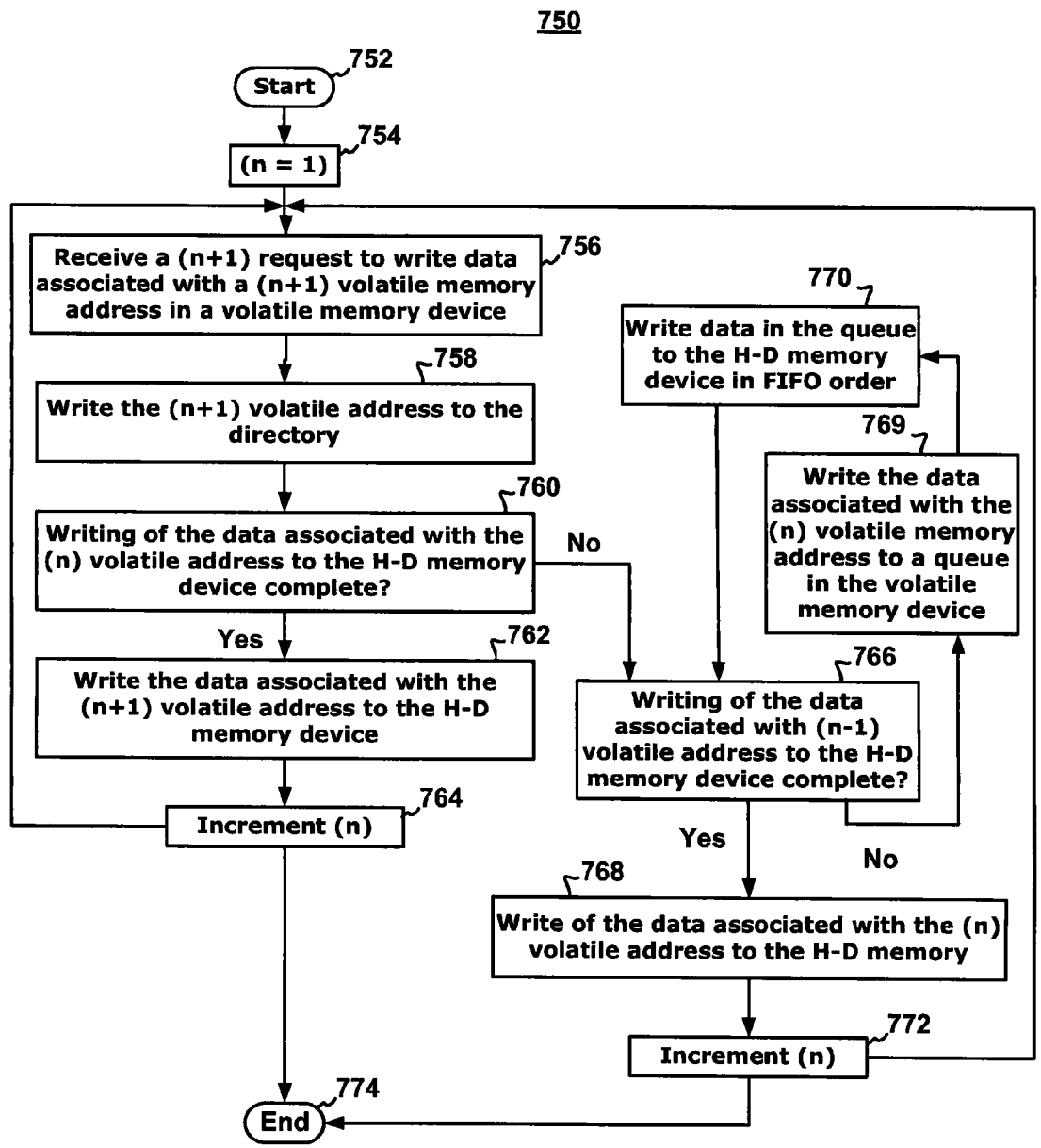

FIG. 14 depicts a method 750 for efficient memory usage according to various embodiments of the present invention. Method 750 may be utilized by control logic 119 to write data in a memory package having two memory types using a volatile memory write interface. Method 750 begins at block 752. At block 754 a value (n)=1. A (n+1) request to write data associated with a (n+1) volatile memory address in a volatile memory device is received (block 756). The (n+1) volatile memory address is written to a directory in the volatile memory device (block 758). It is determined if the data associated with the (n) volatile memory address has been written to a high-density memory device (block 760). If the data associated with the (n) volatile memory address has been written to the high-density memory device, the data associated with the (n+1) volatile memory address is written to the high-density memory device (block 762). If another request to write data is received, (n) is incremented in block 764, and method 750 returns to block 756. If there is no other requests to write data, method 750 ends at block 774.

If the data associated with the (n) volatile memory address has not been successfully written to the high-density memory device (e.g. the writing is still in occurring, etc.), it is determined if the data associated with a (n−1) volatile memory address (if any) has been successfully written to the high-density memory device (block 766). If the data associated with the (n−1) volatile memory address has been successfully written to the high-density memory device, the data associated with the (n) volatile address is written to the high-density memory device (block 768). If another request to write data is received, (n) is incremented in block 772, and method 750 returns to block 756. If there is no other requests to write data, method 750 ends at block 774.

If the data associated with the (n−1) volatile memory address has not been successfully written to the high-density memory device, the data associated with the (n) volatile memory address is written to a queue in the volatile memory device (block 769). The data within the queue is written to the high-density memory device in a first in first out (or other arbitration scheme) order (block 770). In other words, address may be written to the directory in the volatile memory device, even though the data associated with the previous address are being written to the high-density memory device, or are otherwise in a to-be-written state. In this manner, the queue in the volatile memory device serves as a cache for the high-density memory device.

Figure 15:
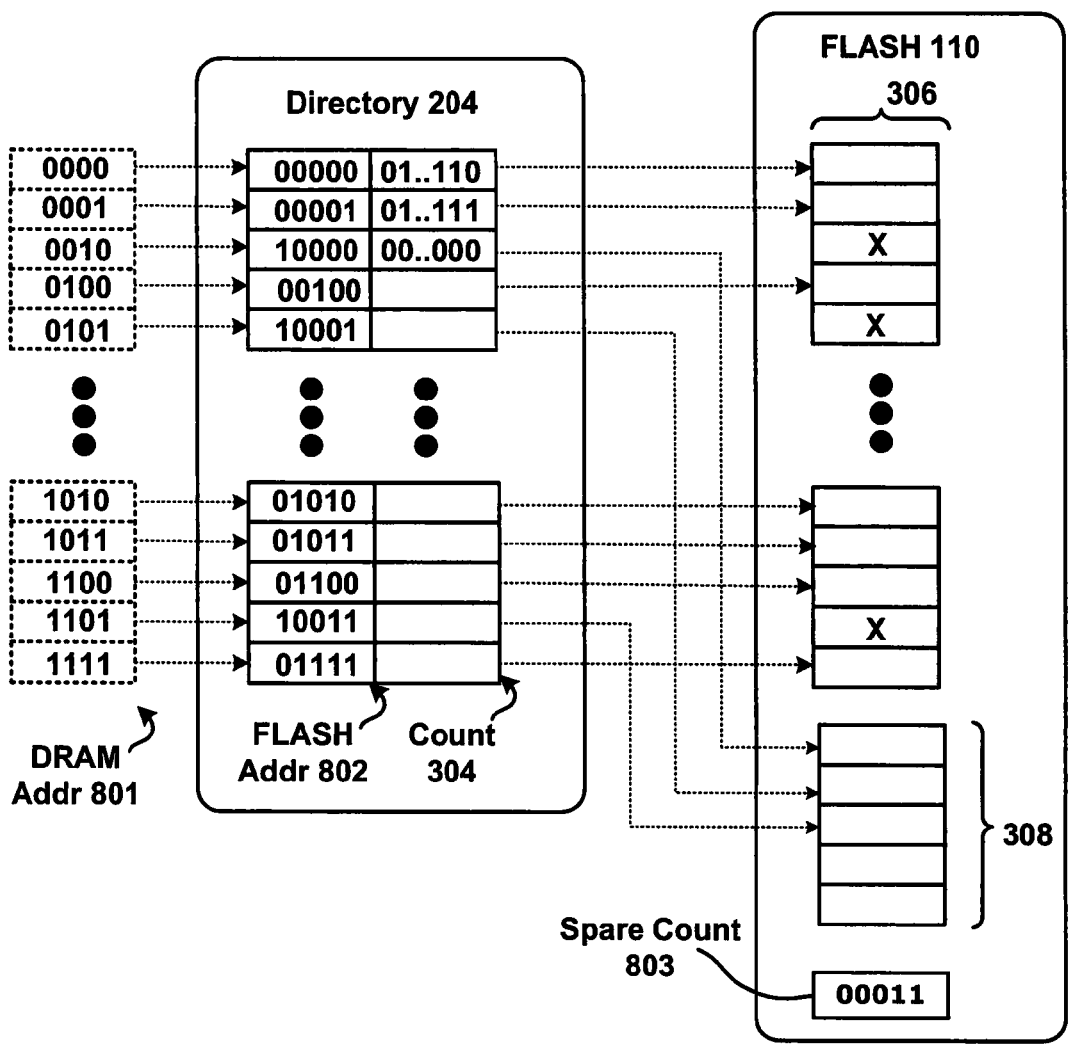
FIG. 15 depicts an exemplary directory scheme to map a volatile memory address to a high-density memory address in accordance with various embodiments of the present invention.

FIG. 15 depicts an exemplary directory 204 to map a volatile memory address to a high-density memory address in accordance with various embodiments of the invention. A four bit volatile memory address 801 is received by directory 204 and the data associated with the address may be temporarily stored in queue 212. The four bit address is associated to a particular entry in a flash address table 802. For example, an entry in the flash address table is dedicated to a particular volatile memory address. Other association schemes may also be utilized.

The high-density memory address where the data, associated with the volatile memory address, is ultimately stored is written to the associated entry in the high-density address table 802. An extra bit is added in the high-density address to indicate whether the data stored in redundant storage 308 in high density memory 110. For example, the "0000" volatile memory address is associated to the "00000" high-density memory address, the "0001" volatile memory address is associated to the "00001" high-density address, etc.

Under normal conditions volatile memory address "0010" is associated with high-density address "00010". However, in the example shown in FIG. 15, high-density address "00010" has been written to or read from a threshold number of instances and should therefore not be read from (the data moved to another location in high density memory 110). Because the high-density address "00010" is not utilized, a new association between volatile memory address "0010" and an operable high-density address in needed. A first entry in redundant storage 308 (e.g., high-density address "10000") therefore is associated with volatile memory address "0010". Subsequent to data being stored in redundant storage, a spare count 803 is incremented. Spare count 803 is utilized to indicate the number of addresses away from an initial address, within redundant storage 308 where new data may be written. Therefore, the association between a volatile address and a high-density address is maintained even if data is moved from a previous high-density address. When the new association between the volatile address "0010" and the high-density address "10000" is made, the write counter 304 associated with volatile address "0010" is reset to zero.

In a particular embodiment, memory package 202 or stacked memory package 203 may be utilized in conjunction with a conventional DRAM controller that expects data to be written and read at specific bandwidth and latency.

During a read operation attempting to read data at an addresses within the volatile memory (e.g., an address associated with data in the workspace 120, etc.), the array can be read or otherwise serviced in the conventional manner. Reads that miss the cache (e.g. the data has been stored in high-density memory 110, etc.) may be determined during a DRAM activate command sent before an actual read command. In some circumstances, the data may not be completely read from high-density memory 110 prior to a subsequent read command being received from the DRAM controller. Therefore, the memory package 202 or stacked memory package 203 may signal the conventional DRAM controller when it cannot carry out a request. A first option is for a signal from memory package 202 or stacked memory package 203 to the DRAM signaling when the memory package 202 or stacked memory package 203 cannot service a request (e.g., a wait state, etc.) or to retry a request because the memory package 202 or stacked memory package 203 is busy. Another option is to equate traditional signaling for "bad" transmissions (e.g., bad Cyclic Redundancy Check or parity error, etc.) with a retry operation.

During a write operation, the memory package 202 or stacked memory package 203 may be serviced with a write/allocate policy writing to the DRAM cache (e.g., queue 212, etc.) by evicting unmodified cache lines as needed and write to high-density memory 110 utilizing any number of various algorithms. For example, a lazy write policy may be utilized so that a write to high-density memory 110 is started only if there is enough time to complete, or is started when enough data has accumulated to write to a page of high-density memory 110. In some embodiments, it is preferred to avoid where memory package 202 or stacked memory package 203 receiving a stream of writes that it cannot keep up with by evicting cache lines.

A first option is to utilize a higher refresh rate in the memory package 202 or stacked memory package 203. The refresh rate may be sufficiently frequent to throttle the write rate to enable the cache write-backs to the memory package 202 or stacked memory package 203 arrays. Alternatively, the refresh rate may even be specified to the DRAM controller as a variable rate based on write rate.

Another option is to provide a means for the memory package 202 or stacked memory package 203 to signal the DRAM controller when it cannot carry out a request. This may be completed by utilizing a new signal from the memory package 202 or stacked memory package 203 to the DRAM controller to signal when the memory package 202 or stacked memory package 203 cannot service a request (e.g. wait-state, etc.) or to retry a request because the memory package 202 or stacked memory package 203 is busy, or alternatively may be completed by equating traditional signaling for "bad" transmissions (e.g., bad Cyclic Redundancy Check or parity error, etc.) to a retry operation.

The cache (e.g., queue 212, etc.) may be comprised of a common ASIC integrated with control circuits and EDRAM or other memory technology, or an arrangement of separate memory and controller devices. The control circuits may perform error correction and detection for high-density memory 110 and/or the memory package 202 or stacked memory package 203.

It is to be understood that the present invention, in accordance with at least one present embodiment, includes elements that may be implemented on at least one electronic enclosure, such as general-purpose server running suitable software programs.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Therefore, it is desired that the embodiments described herein be considered in all respects as illustrative, not restrictive, and that reference be made to the appended claims for determining the scope of the invention.

The invention claimed is:

1. A memory system comprising:
   a main memory comprising a volatile memory electrically connected to a high-density memory;
   a memory controller that writes or reads to or from the main memory at a bandwidth and a latency associated with the volatile memory;
   a directory within the volatile memory that associates a volatile memory address with data stored in the high-density memory; and
   redundant storage in the high-density memory that stores a copy of the association between the volatile memory address and the data stored in the high-density memory.

2. The memory system of claim 1 wherein one or more high-density memories are vertically stacked upon the volatile memory.

3. The memory system of claim 2 wherein the one or more high-density memory are electrically connected to the volatile memory utilizing one or more through-silicon vias.

4. The memory system of claim 1 further comprising:
   a queue in the volatile memory for temporarily storing the data to be stored in the high-density memory.

5. The memory system of claim 1 wherein the volatile memory and the high-density memory are assembled into a single physically discrete memory package.

6. The memory system of claim 5 wherein a plurality of the single physically discrete memory packages are electrically connected to the memory controller.

7. A method of memory management comprising:
   receiving, in a main memory, a request to write data associated with a volatile memory address in a volatile memory device having a volatile write interface at a bandwidth and a latency associated with the volatile memory;
   associating, in the main memory, the volatile memory address to a high-density memory address in a high-density memory device;
   writing the data associated with the volatile memory address to the high-density memory address in the high-density memory device; and
   storing the association between the volatile memory address and the high-density memory address in the high-density memory device.

8. The method of claim 7 further comprising:
   incrementing a write count associated with the high-density memory address.

9. The method of claim 7 further comprising:
   determining if a write count associated with the high-density memory address is greater than a threshold.

10. The method of claim 9 further comprising:
    if the write count associated with the high-density memory address is greater than the threshold, blocking data from being written to the high-density memory address; and
    writing the data to a second high-density memory address in the high-density memory device.

11. The method of claim 10 further comprising:
storing the association between the volatile memory address and the second high-density memory address in the high-density memory device.

12. The method of claim 7 further comprising:
storing the volatile memory address in a directory in the volatile memory device; and
temporarily storing the data associated with the volatile memory address in a queue in the volatile memory device.

13. The method of claim 12 further comprising:
writing the data temporarily stored in the queue to the high-density memory device in a first-in-first-out order.

14. The method of claim 7 further comprising:
if the data associated with the volatile memory address is not characterized as data that is primarily read, writing the data associated with the volatile memory address in a DRAM memory device.

15. The method of claim 7 further comprising:
writing the data associated with the volatile memory address to the high-density memory address in the high-density memory device only if the data associated with the volatile memory address is characterized as data that is primarily read.

16. A method of memory management comprising:
receiving, in a main memory, a request to read data associated with a volatile memory address in a volatile memory device having a volatile read interface at a bandwidth and a latency associated with the volatile memory device;
determining, in the main memory, a high-density memory address in a high-density memory device that is associated with the volatile memory address; and
reading the data at the high-density memory address in the high-density memory device.

17. The method of claim 16 further comprising:
incrementing a read count associated with the high-density memory address.

18. The method of claim 16 further comprising:
determining if a read count associated with the high-density memory address is greater than a threshold;
moving the data associated with the high-density memory address to a second high-density memory address; and
storing the association between the volatile memory address and the second high-density memory address in the high-density memory device.

19. The method of claim 18 further comprising:
storing the association between the volatile memory address and the second high-density memory address in the volatile memory device.

* * * * *